Feb. 21, 1939. F. F. BRUCKER 2,148,101
SEALING ASSEMBLY
Filed March 3, 1937
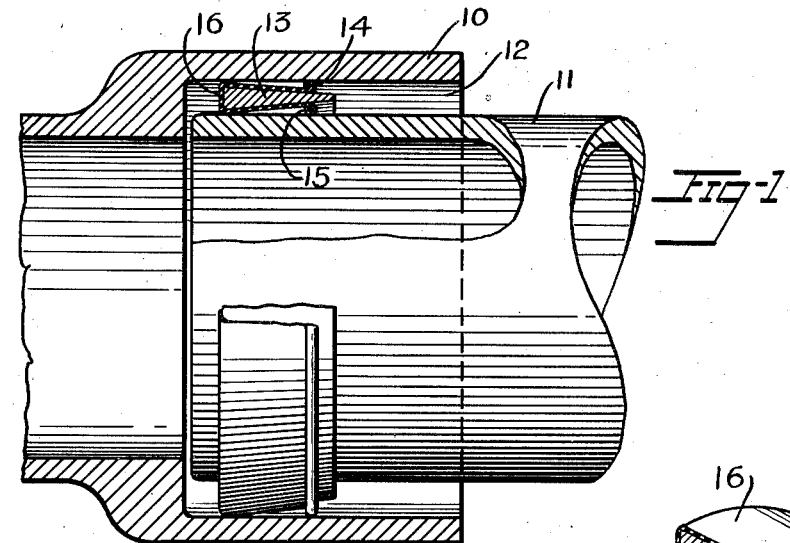
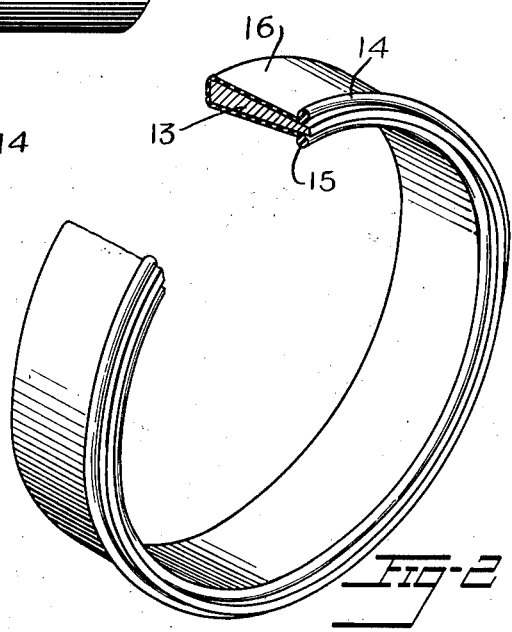
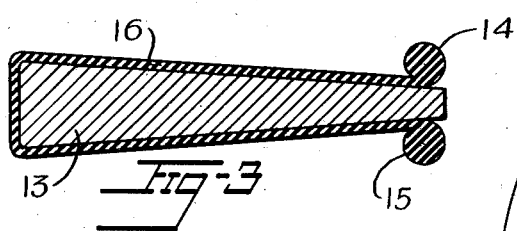
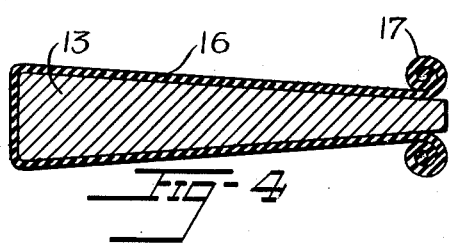
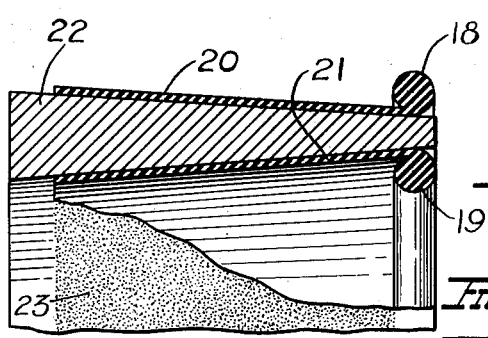
Inventor
Ferdinand F. Brucker
By
Willis F. Avery Patented Feb. 21, 1939

2,148,101

UNITED STATES PATENT OFFICE 2,148,101

SEALING ASSEMBLY

Ferdinand F. Brucker, Akron, Ohio, assignor to The B. F. Goodrich Company, New York, N. Y., a corporation of New York Application March 3, 1937, Serial No. 128,733

6 Claims. (Cl. 285—163)

This invention relates to sealing assemblies in which the space is sealed between concentric rigid members such as sections of a pipe line of bell and spigot joint pipe.

The principal objects of the invention are to provide simplicity of structure, to provide efficiency of sealing, to provide accuracy of positioning of the sealing structure in the joint, and to provide facility of handling and positioning the parts. These and other objects will appear from the following description and the accompanying drawing.

Of the drawing:

Fig. 1 is a sectional elevation of a joint between bell and spigot members of a pipe line showing the sealing structure in place, parts of the sealing structure and the pipe members being broken away.

Fig. 2 is a perspective view of the assembled sealing structure, parts of the structure being broken away and parts shown in section to illustrate its structure.

Fig. 3 is a radial cross-sectional view of the sealing structure of Fig. 2, showing one form of the invention with the parts in the positions relative to each other which they assume before the member is inserted in the joint.

Fig. 4 is a similar view of another form of the invention.

Fig. 5 is a similar view showing a further form of the invention.

Referring to the drawing, the numeral 10 designates the bell of one section of pipe, and 11 the spigot of an adjacent section. An annular space 12 is provided between the bell and spigot and is utilized to enclose the sealing member. In pipe of ceramic material or metal, considerable variation in dimensions and shape often occurs.

The sealing member, in the form illustrated in Figs. 1 to 3, comprises an annular ring 13, having inner and outer conical surfaces of non-parallel relation to each other providing a ring wedge shaped in cross section, and a pair of flexible annular packing elements 14, 15 adapted to roll upon the outer and inner conical surfaces of the ring 13 and held in place by a connecting web 16 extending around the thicker margin of the wedge ring and preferably comprising a continuous annular pocket adapted to embrace the wedge ring and attached to the packing elements 14, 15, the arrangement being such that when the thicker edge of the wedge ring is inserted in the annular pocket the web 16 will position the packing members 14, 15 equidistantly from the thicker edge of the wedge ring.

The assembled packing elements and wedge ring are placed in the space 12 between the pipe members with the thicker edge of the wedge foremost or toward the bottom of the space 12. The proportions are such that in this position the packing element 14 will engage the inner surface of the bell 10 and the packing element 15 will engage the outer surface of the spigot 11. Where, as in the preferred construction, the web 16 is formed integrally with the packing elements, of soft vulcanized rubber or other material having similar physical properties, any resistance to passage of the packing elements into the space 12, such as would be caused by partial obstruction of the space 12, will result in stretching of the web so as to permit movement of the wedge ring with relation to the packing elements in a direction which permits movement of the packing elements toward each other. Such movement however will so tension the web as to return the packing elements to their original positions after the obstruction is passed, or, where the obstruction is not passed, will tend to prevent any great displacement axially of the pipe of the packing elements with respect to one another. Equalization of the tension in the inner and outer reaches of the web 16 and consequent adjustment of the packing elements is more effectively realized where the wedge ring is made of slightly deformable material such as semi-hard rubber, as the wedge ring may be then locally deflected to assist in automatic positioning of the packing element where the pipe is slightly out of round or slight local deformities are present on the surface thereof.

After the assembled sealing structure has been placed in position, application of fluid pressure to the line will cause the wedge ring to be pressed toward the open end of the space 12 causing the packing elements to roll upon the web 16 along the conical surfaces of the wedge. Such rolling motion causes the margins of the web to be wound around the packing elements as rolling progresses, and the increasing thickness of the packing elements caused thereby together with their rolling movement toward the thicker edge of the wedge ring causes them to exert more and more pressure against the surfaces of the bell and spigot, thereby increasing the sealing pressure as the fluid pressure increases.

In order to decrease the initial resistance to rolling of the packing elements, they may be formed of sheet material coiled upon itself as at 17 in Fig. 4 with the material in adjacent turns thereof unadhered to each other. The coils may be formed of continuations of the sheet which comprises the adjacent web 16. To prevent adhesion during manufacture, the margins of the web may be heavily dusted with powdered soapstone or mica and the margins rolled upon themselves to form the coiled packing members before vulcanization. After vulcanizattion the material will retain its coiled form.

In the modification shown in Fig. 5 each of the packing elements 18, 19 is formed with an independent web 20, 21. Each of these webs is attached along its free margin to the wedge ring 22 by a layer of cement, as at 23 leaving the margin adjacent the packing member unattached and free to be rolled about the packing element. In this form the wedge ring may be of metal or of semi-hard rubber as in the other forms of the device.

I claim:

1. Sealing means for an annular fluid passage comprising an annular sealing member tapered in cross-section in an axial direction and adapted to be driven in an axial direction with its thinner portion forward by the fluid pressure, a pair of annular sealing members engaging the outer and inner surfaces respectively of the said tapered sealing member and adapted to be rolled on annular axes by relative movement between said tapered sealing member and the walls defining the fluid passage, and a web of pliable material connecting said sealing members and extending about the thicker portion of said sealing member.

2. Sealing means for an annular fluid passage comprising an annular sealing member tapered in cross-section in an axial direction and adapted to be driven in an axial direction with its thinner portion forward by the fluid pressure, a pair of annular deformable sealing members engaging the outer and inner surfaces respectively of the said tapered sealing member and adapted to be pressed respectively against annular zones of the walls defining said passage by relative movement between said tapered sealing member and said walls, and a web of flexible material connecting said annular sealing members and extending about the thicker portion of said tapered sealing member, the tapered sealing member being formed of flexible material such as to permit it to accommodate itself to an out of round condition of one or both of the walls defining the annular passage.

3. Means for sealing an annular fluid passage between two members, said means comprising an annular ring of wedge shaped cross-section adapted to be driven axially with its thinner end foremost by the fluid pressure, and a web of material extending around the thicker margin of the wedge ring and provided at the outer and inner faces of the wedge ring with rolled margins adapted to be engaged between the faces of the wedge ring and the faces of the members.

4. A pipe joint assembly comprising a pair of telescoped pipe members defining an annular space therebetween communicating with the interior of the pipe members, an annular cam member located in and movable along said space axially of the pipe under the pressure of fluid within the pipe and having at least one axially inclined face opposed to the surface of one of the pipe members, a rollable annular resilient sealing element in said space between the inclined face of the annular member and the surface of the pipe, and means secured to said cam member for initially locating said sealing element axially of said annular member in said annular space.

5. A pipe joint assembly as defined by claim 4 in which the annular cam member is made of pliable material.

6. A pipe joint assembly as defined by claim 4 in which the means for initially locating said sealing element is a flexible apron on said sealing element and engaging said annular member.

FERDINAND F. BRUCKER.